US008642133B2

(12) United States Patent
Hsueh et al.

(10) Patent No.: US 8,642,133 B2
(45) Date of Patent: *Feb. 4, 2014

(54) STRUCTURE AND ITS METHOD FOR HYDROPHOBIC AND OLEOPHOBIC MODIFICATION OF POLYMERIC MATERIALS WITH ATMOSPHERIC PLASMAS

(71) Applicant: Institute of Nuclear Energy Research, Atomic Energy Council, Executive Yuan, R.O.C., Taoyuan County (TW)

(72) Inventors: Tien-Hsiang Hsueh, Taoyuan County (TW); Mien-Win Wu, Taoyuan County (TW); Chi-Fong Ai, Taoyuan County (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,005

(22) Filed: Mar. 6, 2013

(65) Prior Publication Data

US 2013/0183457 A1 Jul. 18, 2013

Related U.S. Application Data

(62) Division of application No. 12/545,664, filed on Aug. 21, 2009, now Pat. No. 8,414,980.

(51) Int. Cl.
*C08J 7/18* (2006.01)

(52) U.S. Cl.
USPC .............................. 427/490; 427/488

(58) Field of Classification Search
USPC ................................... 427/490, 488
See application file for complete search history.

(56) References Cited

U.S. PATENT DOCUMENTS 6,551,950 B1  4/2003 Badyal et al.
7,449,233 B2  11/2008 Arora

OTHER PUBLICATIONS

Teshimaa, Katsuya., et al. Transparent ultra water-repellent poly(ethylene terephthalate) substrates fabricated by oxygen plasma treatment and subsequent hydrophobic coating, Journal of Applied Surface Science., Jan. 18, 2005, pp. 619-622, vol. 244, Elsevier B.V.
Inoue, Youichi, et al., Ultra-hydrophobic fluorine polymer by Ar-ion bombardment, Colloids and Surfaces B: Biointerfaces., 2000, vol. 19, pp. 257-261, Elsevier Science B.V.

*Primary Examiner* — Robert S Walters, Jr.
(74) *Attorney, Agent, or Firm* — Jackson IPG PLLC

(57) ABSTRACT

The present invention fabricates a hydrophobic and oleophobic polymer fabric through two stages of modification using atmospheric plasmas. The modified fabric has a rough surface and a fluorocarbon functional group having the lowest surface free energy. The fabric has a grafted fluorocarbon monomer layer to enhance the graft efficiency of the fluorocarbon functional groups and its wash fastness. The atmospheric plasmas can be mass produced and less expensively. Hence, the present invention can rapidly modify surfaces of polymeric materials with low cost and good environment protection.

13 Claims, 4 Drawing Sheets

|  | Before modification | After irradiation by atmospheric filamentary discharge plasma | After grafting fluorocarbon monomers | Curing and drying |
|---|---|---|---|---|
| Contact angle of water droplet (°) | 100 | 40 | 80 | 150 |
| Contact angle of oil droplet (°) | 15 | 5 | 10 | 120 |

FIG.3

STRUCTURE AND ITS METHOD FOR HYDROPHOBIC AND OLEOPHOBIC MODIFICATION OF POLYMERIC MATERIALS WITH ATMOSPHERIC PLASMAS

FIELD OF THE INVENTION

This invention is related to a structure and its method for hydrophobic and oleophobic modification of polymeric materials with atmospheric plasmas. It relates to the modification process firstly using atmospheric filamentary discharge plasma and carbon tetrafluoride plasma, respectively, to activate and roughen the surface of a polymeric material and then followed by the two stages of graft polymerization of a fluorocarbon monomers and a fluorocarbon functional group for obtaining hydrophobicity and oleophobicity.

DESCRIPTION OF THE RELATED ARTS

In order to enhance the wash fastness of a textile, the following chemical agents has usually been used in the conventional methods for modifying the surfaces of the textile: one is an initiator containing free radicals such as hydrogen peroxide, potassium persulfate and azo compound; and the other is a cross-linking agent consisting of low concentration of formaldehyde. However, the concentrations of these chemical agents used have been raised significantly in order to achieve better wash fastness. Thus, the environment is polluted seriously.

Plasma consists of a lots of active species such as electrons, ions, free radicals, and ultra violet radiations. Because these active species exist only in a reaction chamber, they do not cause any environment pollution. However, these active species can induce broken chemical bonds on the treated substrate; and after exposure to air, high reactive peroxides are formed due to its contact with oxygen on the surface of the treated substrate. Hence, it is the best choice to replace these chemical agents with plasmas. One of the great advantage of atmospheric plasma over low-pressure plasma is that it does not need the expensive vacuum facilities. Accordingly, the size of the treated substrate can be scaled up readily for mass production with low costs. Moreover, the surface modifications of polymeric materials by using the atmospheric plasma do not induce any environment pollution.

Although the atmospheric plasma is more competitive than the low-pressure plasma, its related techniques have been well developed only quite recently as compared to the matured development of low-pressure plasma in 50 years ago. In 1988, Kanazawa, etc. found that atmospheric pressure glow discharge plasma can be generated under the following three conditions, including a working gas of helium or its mixture, a high-voltage power supply with a frequency of 1 kHz, and an electrode with a proper structure and a proper electrode gap. Since the production of the atmospheric plasma does not require expensive vacuum facilities and has no limit on the size of the substrate, many technologies of atmospheric plasma applications are developed thereafter, especially those for mass production of atmospheric plasma applications used in the treatment of polymeric materials, such as roll-to-roll textiles and polymer films. However, the surface treatments for U.S. Pat. No. 6,551,950 disclosed in 2003 and U.S. Pat. No. 7,449,233 in 2008 were all processed at low pressure. Thus, expensive vacuum facilities are required, the size of the treated substrates are greatly limited, Thus, low-cost and high-throughput productions are rather difficult to achieve. Furthermore, the hydrophobic and oleophobic properties obtained from the surface modifications using ordinary perfluorocarbons and perfluoropolyether silicon compounds in the previous US patents are inferior to those attained through the carbon tetrafluoride plasma modification in present application.

As shown in the above prior arts, there are following obstacles to the improvements of the hydrophobicity and oleophobicity of the polymeric material: too low roughness, only monomers of fluorocarbon compound grafted and no fluorocarbon functional group grafted. Hence, the prior arts do not meet all users' requirements in textile industry.

SUMMARY OF THE INVENTION

The main purpose of the present invention is to use atmospheric pressure filamentary discharge plasma and carbon tetrafluoride plasma to roughen and activate the surface of a polymeric material followed by graft polymerization of both fluorocarbon monomers and a fluorocarbon functional group for obtaining hydrophobicity and oleophobicity.

The second purpose of the present invention is to produce a structure with enhanced hydrophobicity and oleophobicity, low cost and environmentally-friendly processes to be economically used in plastics and textile industries.

To achieve the above purpose, the present invention is to provide a structure of a polymeric material with hydrophobic and oleophobic modification by using atmospheric plasmas and a fabrication method thereof, where the structure comprises a plasma-roughened substrate, a grafted fluorocarbon monomer layer on the substrate and a grafted fluorocarbon functional group layer on the grafted fluorocarbon monomer layer; the method comprises steps of: (a) insertion of the substrate into an atmospheric filamentary plasma area, by using the first plasma working gas for generating an atmospheric filamentary discharge plasma, irradiating the atmospheric filamentary discharge plasma on the surface of the substrate to activate and roughen the surface for obtaining an active and rough surface of the substrate; (b) exposure of the substrate to air for forming peroxides on the activated and roughened surface of the substrate; (c) immersion of the substrate in the solution of fluorocarbon compound for grafting fluorocarbon monomers or oligomers on the substrate for obtaining the grafted fluorocarbon monomer layer on the rough surface of the substrate; (d) the graft polymerization of a fluorocarbon functional group by generating a carbon tetrafluoride plasma with a second plasma working gas and irradiating the carbon tetrafluoride plasma on the grafted fluorocarbon monomer layer for obtaining the grafted fluorocarbon functional group layer on the grafted fluorocarbon monomer layer; and (e) curing and drying of the substrate to generate cross-links both on the grafted fluorocarbon monomer layer and the grafted fluorocarbon functional group layer and between the grafted fluorocarbon monomer layer and the grafted fluorocarbon functional group layer. Accordingly, a novel structure of a polymeric material with a hydrophobic and oleophobic modification by using atmospheric plasmas and a novel fabrication method thereof are obtained.

BRIEF DESCRIPTION OF THE DRAWINGS

The present invention will be better understood from the following detailed description of the preferred embodiment according to the present invention, taken in conjunction with the accompanying drawings, in which

FIG. 3 shows a list for the contact angles of water droplet and those of oil droplet for various fabrication processes.

DESCRIPTION OF THE PREFERRED EMBODIMENT

The following description of the preferred embodiment is provided to understand the features and the structures of the present invention.

Figure 1:
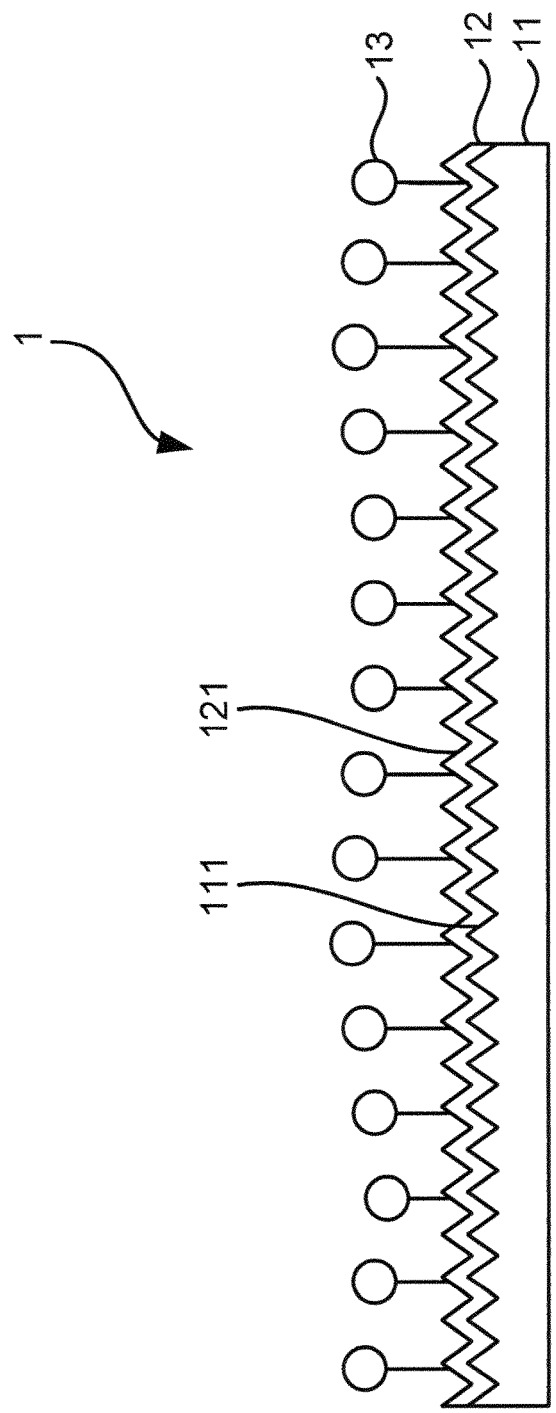
FIG. 1 is the cross-sectional view of the structure according to the present invention.
Figure 2:
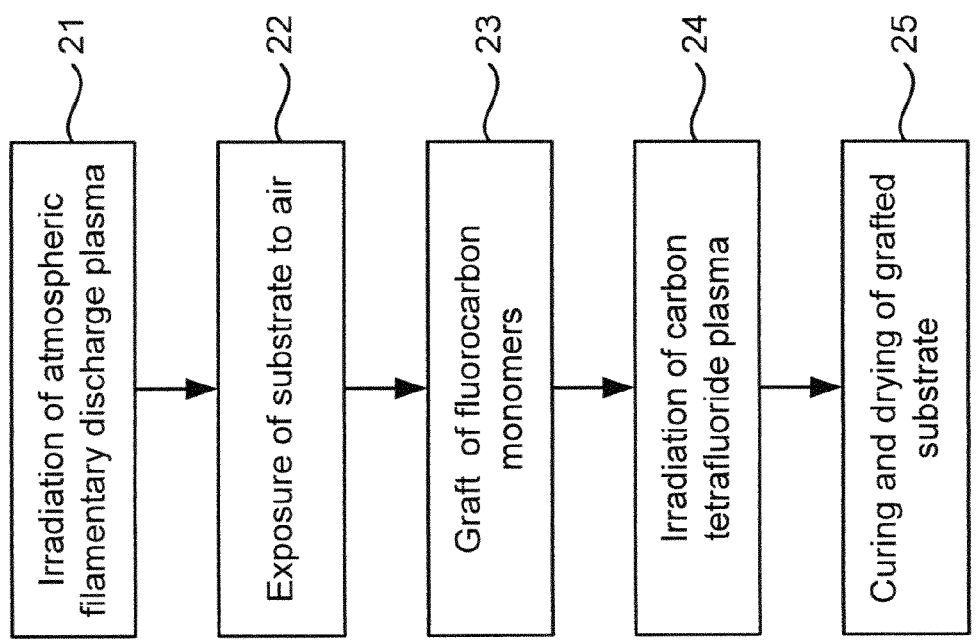
FIG. 2 is the flow chart of the method showing the processes required for the preferred embodiment.

Please refer to FIG. 1 and FIG. 2, which are a cross sectional view of a structure and a flow chart of the method showing a preferred embodiment according to the present invention. As shown in the figures, the present invention is a structure of a polymeric material with hydrophobic and oleophobic modification by using atmospheric plasmas and a fabrication method thereof. The structure 1 comprises a substrate 11, a grafted fluorocarbon monomer layer 12; and a grafted fluorocarbon functional group layer 13, where there is a first rough surface 111 on the substrate 11; the grafted fluorocarbon monomer layer 12 is formed on the first rough surface 111 of the substrate 11, in which a second rough surface 121 is induced with same roughness as that of the first rough surface 111; and the grafted fluorocarbon functional group layer 13 is formed on the second rough surface 121 of the grafted fluorocarbon monomer layer 12. The fabrication method of the structure 1 comprises the following steps:

(a) Irradiation of atmospheric filamentary discharge plasma 21 on substrate: The substrate 11 is moved into an atmospheric plasma area in a roll-to-roll way. A first plasma working gas is used for generating atmospheric filamentary discharge plasma to irradiate on the surface of the substrate 11. The surface of the substrate 11 is thus activated and roughened to obtain a first rough surface 111 of the substrate 11. The roughness of the first rough surface 111 of the substrate 11 is adjusted to a required value by adjusting the power density of the atmospheric filamentary discharge plasma and adjusting the period of time for irradiation of substrate with the atmospheric filamentary discharge plasma. Therein, the first plasma working gas is a mixture of oxygen ($O_2$) and helium (He) or a mixture of $O_2$ and argon (Ar); and, the first rough surface 111 of the substrate 11 is hydrophilic and has a roughness not smaller than 20 nanometer (nm).

(b) Exposure of substrate to air 22: The substrate is exposed to air after being irradiated by the atmospheric filamentary discharge plasma and peroxide is thus formed on the first rough surface 111 of the substrate 11.

(c) Graft of fluorocarbon monomers 23: The substrate 11 with peroxides is immersed in a solution of fluorocarbon compound for grafting fluorocarbon monomers or oligomers to form a grafted fluorocarbon monomer layer 12 on the first rough surface 111 of the substrate 11. The grafted fluorocarbon monomer layer 12 has a second rough surface having the same roughness as that of the first rough surface of the substrate for obtaining preliminary hydrophobicity and oleophobicity. Therein, the fluorocarbon compound is perfluoroalkylsilane; further, is 1H,1H,2H,2H-perfluorooctyldimethyl chlorosilane (PFDMCS) or fluoroalkyl silane; and, the grafted fluorocarbon monomer layer 12 has a thickness between 5 and 200 nm.

(d) Irradiation of carbon tetrafluoride plasma 24: The grafted fluorocarbon monomer layer 12 is processed further through a second stage of grafting and polymerizing a fluorocarbon functional group. A second plasma working gas is used to form a carbon tetrafluoride plasma to be irradiated on the second rough surface 121 of the grafted fluorocarbon monomer layer for an enhanced hydrophobic and oleophobic modification, where a grafted fluorocarbon functional group layer 13 is thus formed on the second rough surface 121 of the grafted fluorocarbon monomer layer 12. Therein, the second plasma working gas is a mixture of He and carbon tetrafluoride ($CF_4$); the grafted fluorocarbon functional group layer 13 is a modified layer having a fluorocarbon functional group; and the grafted fluorocarbon functional group layer 13 has a thickness between 5 and 20 nm.

(e) Curing and drying of the substrate 25: The substrate 11 with a grafted fluorocarbon monomer layer and a grafted fluorocarbon functional group layer is cured and dried to generate cross-links on both the grafted fluorocarbon monomer layer 12 and the grafted fluorocarbon functional group layer 13 and between the grafted fluorocarbon monomer layer 12 and the grafted fluorocarbon functional group layer 13. Thus, a novel structure 1 having hydrophobic and oleophobic modification is fabricated through the method according to the present invention.

Therein, the atmospheric filamentary discharge plasma and the carbon tetrafluoride plasma used in the present invention are all low-temperature plasma, so the present invention can be applied to polymeric materials, which is not fit for high temperature treatments, such as polypropylene (PP), polyethylene (PE), polyethylene terephthalate (PET), polyamide (PA) and cotton.

Please refer to FIG. 3, which is a list showing contact angles of water droplet and those of oil droplet. As shown in the list, before the surface modification using present invention, the roughness of the substrate of a polymer fabric is about 2 nm, its contact angle of water droplet and oil droplet (n-hexadecane) is about 100° and 15°, respectively. After curing and drying of the grafted substrate, its contact angle of water droplet and oil droplet increases to 150° and 120°, respectively Please refer to FIG. 4, which shows the relative concentration of fluorine atoms of the substrate before and after each stage of modification. The substrate is processed through two stages of a hydrophobic and oleophobic modification with atmospheric plasmas.

According to FIG. 2, the 5 steps of the fabrication method are described in detail in the following.

[Step 1] Irradiation of Atmospheric Filamentary Discharge Plasma

The substrate is moved into an atmospheric plasma area in a roll-to-roll way. He or Ar is mixed with $O_2$ for obtaining a plasma working gas to be filled in at a rate of $O_2$/He or $O_2$/Ar not smaller than 10% and a flow ratio of 4 slm. A power density is increased to not smaller than 0.9 W/cm$^2$ for generating an atmospheric filamentary discharge plasma to be irradiated on the polymer fabric for activating and roughening the substrate. Therein, through a local heat effect of the atmospheric filamentary discharge plasma, a surface of the polymer fabric is etched to form a rough surface with a high roughness, where the power density is adjusted for 3 to 5 minutes (min) to obtain the required roughness of about 26 nm. The activated and roughened surface of the substrate thus obtained is highly hydrophilic, with its contact angle of water droplet and oil droplet to be decreased to 40° and 5°, respectively.

[Step 2] Exposure of Substrate to Air

Then, the polymer fabric being irradiated by the atmospheric filamentary discharge plasma is exposed to air for 6 min to form highly active peroxide on the rough surface of the polymer fabric.

[Step 3] Graft of Fluorocarbon Monomers

The polymer fabric with peroxide is immersed in the solution of fluorocarbon compound for 3 to 5 min for a first stage of graft of fluorocarbon monomers. The peroxide of the substrate grafts monomers of PFDMCS to form a grafted fluorocarbon monomer layer on the rough surface of the polymer fabric. Therein, after the grafted fluorocarbon monomer layer is formed on the polymer fabric, the contact angle of water droplet and oil droplet is increased to 80° and 10°, respectively. The characteristic of the modified surface is not only hydrophobic and oleophobic, but also with fluorocarbon monomers on its surface, which will facilitate for the following graft of fluorocarbon functional group.

[Step 4] Irradiation of Carbon Tetrafluoride Plasma

The polymer fabric with the grafted fluorocarbon monomer layer is processed through a second stage of grafting and polymerizing a fluorocarbon functional group. A mixture of He and $CF_4$ is used as a plasma working gas under one atmospheric pressure at a flow rate of 9:1 ($CF_4$/He=11%). A power density is set not smaller than 0.6 W/cm$^2$ for obtaining a carbon tetrafluoride plasma to be irradiated on the grafted fluorocarbon monomer layer of the polymer fabric for an enhanced hydrophobic and oleophobic modification. Since the carbon tetrafluoride plasma has a lot of free radicals such as —$CF_3$, —$CF_2^-$, —$CF_2$—$CF_3$, fluorine atom and fluorine ion, these highly reactive groups such as fluorine atom and fluorine ion will react strongly with the fluorocarbon monomers on the rough surface of the polymer fabric. That is, hydrogen atoms of PFDMCS and those of its derivative are etched by the discharged hydrogen fluoride. Then, the free radicals in the carbon tetrafluoride plasma rapidly take the original positions of the hydrogen atoms; and graft on the grafted fluorocarbon monomer layer. After graft and polymerization for about 3 min, a grafted fluorocarbon functional group layer with a lowest surface free energy is formed for enhanced hydrophobicity and oleophobicity of the polymer fabric.

[Step 5] Curing and Drying of Substrate

At last, the polymer fabric is cured and dried for 3 min at 150° C., to generate cross-links on both the grafted fluorocarbon monomer layer and the grafted fluorocarbon functional group layer and between the grafted fluorocarbon monomer grafted layer and the grafted fluorocarbon functional group layer to enhance a wash fastness of the polymer fabric while a structure with a hydrophobic and oleophobic modification is obtained. After the curing and drying of the modified substrate, its contact angle of water droplet and oil droplet is increased to 150° and 120°, respectively.

Figure 4:
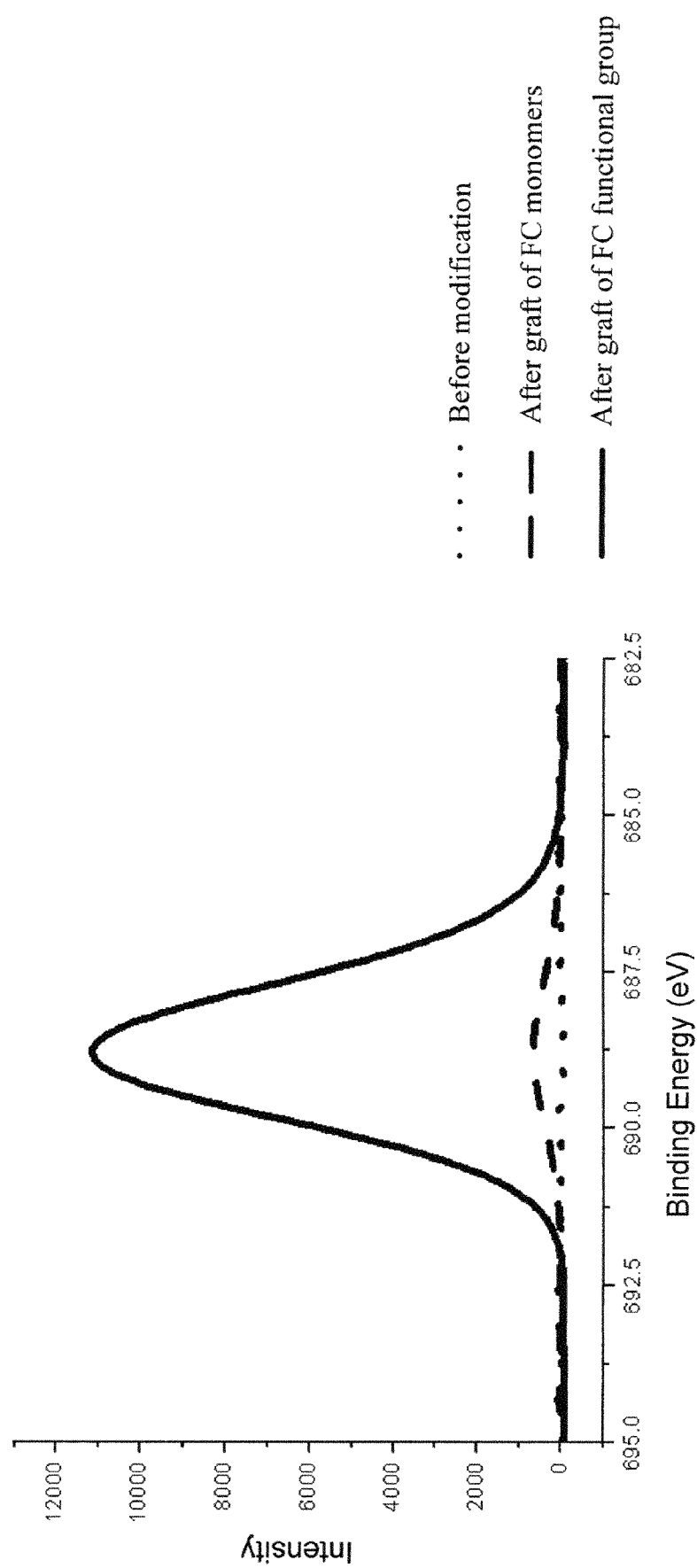
FIG. 4 shows the relative concentration of the fluorine atoms of the substrate before and after each of the graft modifications using XPS analysis.

The contact angles of water droplet and oil droplet before and after each step of modification are listed in FIG. 3. For showing differences of chemical components of the substrate before and after the modification, X-ray photoelectron spectroscopy (XPS) of the substrate is used to analyze the concentration of fluorine atoms on the surface of the polymer fabric before and after the modifications. As shown in FIG. 4, almost no fluorine atoms are detected before the modification and only few fluorine atoms are detected after the graft of fluorocarbon monomers. And a relatively tremendous amount of fluorine atoms are found after the graft of fluorocarbon functional group on the polymer fabric.

The structure of the hydrophobic and oleophobic modification fabricated according to the present invention has a surface with a high roughness and a fluorocarbon functional group having a lowest surface free energy for greatly improved hydrophobicity and oleophobicity. The grafted fluorocarbon monomer layer not only facilitates the graft of a fluorocarbon functional group; but also strengthens the cross-links between the substrate and the fluorocarbon functional group for enhancing the wash fastness of the structure. Even after washing for 40 times, its contact angle of water droplet and oil droplet still meets the requirements of textile industry. Moreover, since the manufacturing process using atmospheric plasmas can readily be configured into mass-production with low cost and is environmentally friendly, the present invention can be economically used in plastics and textile industries.

To sum up, the present invention is a structure of a polymeric material with a hydrophobic and oleophobic modification by using atmospheric plasmas and a fabrication method thereof, where an atmospheric filamentary discharge plasma is used to generate an active and rough surface of a substrate; then a grafted fluorocarbon monomer layer is obtained and with a carbon tetrafluoride plasma a fluorocarbon functional group layer is further grafted, which has a lowest surface free energy; thus, an enhanced hydrophobicity and oleophobicity of the substrate are obtained; and, the present invention can be put in mass production with low cost and is environmentally friendly.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a polymeric material comprising:
    roll-to-roll moving a polymeric material substrate into an atmospheric plasma area;
    generating an atmospheric filamentary discharge plasma with a first plasma working gas so as to irradiate a surface of the substrate and to activate and roughen the surface to create a first rough surface of the substrate;
    exposing the substrate to air after irradiation by the atmospheric filamentary discharge plasma so as to form active peroxide on the first rough surface of the substrate;
    immersing the substrate in a fluorocarbon solution so as to graft at least one of fluorocarbon monomers and fluorocarbon oligomers on the substrate to form a grafted fluorocarbon layer on the first rough surface of the substrate and define a second rough surface having the same roughness as that of the first rough surface of the substrate;
    generating a second plasma with a second plasma working gas so as to create a carbon tetrafluoride plasma and irradiating the carbon tetrafluoride plasma on the grafted fluorocarbon layer to form a fluorocarbon functional group layer on the grafted fluorocarbon layer; and
    curing and drying the substrate to generate cross-links in both the grafted fluorocarbon layer and in the grafted fluorocarbon functional group layer and between the grafted fluorocarbon layer and the grafted fluorocarbon functional group layer such that the polymeric material is hydrophobic and oleophobic.

2. The method of claim 1, wherein generating the atmospheric filamentary discharge plasma is conducted with the first plasma working gas under pressure of one atmosphere.

3. The method of claim 1, wherein the first plasma working gas comprises at least oxygen.

4. The method of claim 3, wherein the first plasma working gas further comprises helium (He) or argon (Ar).

5. The method of claim 1, further comprising adjusting a roughness of the first rough surface of the substrate by adjusting a power density of the atmospheric filamentary discharge plasma and adjusting a period of time of the irradiating of the atmospheric filamentary discharge plasma such that a roughness of the first rough surface is not smaller than 20 nanometer (nm).

6. The method of claim 1, wherein the fluorocarbon monomer is perfluoroalkylsilane.

7. The method of claim 6, wherein the fluorocarbon monomer is 1H,1H,2H,2H-perfluorooctyldimethyl chlorosilane (PFDMCS).

8. The method of claim 1, wherein the formation of the grafted fluorocarbon layer on the first rough surface of the substrate is performed such that the grafted fluorocarbon layer has a thickness between 5 and 200nm.

9. The method of claim 1, wherein the second plasma working gas is a mixture of He and carbon tetrafluoride ($CF_4$).

10. The method of claim 1, wherein the grafted fluorocarbon functional group layer is formed to have a thickness between 5 and 20nm.

11. The method according of claim 1, wherein the first rough surface is hydrophilic and has a roughness not smaller than 20 nm.

12. The method according of claim 1, wherein the grafted fluorocarbon layer is hydrophobic and oleophobic.

13. The method according of claim 1, wherein the carbon tetrafluoride plasma is generated from the second plasma working gas under pressure of one atmosphere.

* * * * *